United States Patent Office 3,515,705
Patented June 2, 1970

3,515,705
PROCESS FOR THE POLYMERISATION
OF ACRYLONITRILE
Georges Balitrand, Chantoiseau, France, assignor to Rhone-Poulenc S.A., Paris, France, a French body corporate
No Drawing. Filed May 15, 1967, Ser. No. 638,558
Claims priority, application France, May 17, 1966, 61,921
Int. Cl. C08f 3/76, 15/22
U.S. Cl. 260—85.5                     12 Claims

ABSTRACT OF THE DISCLOSURE

Acrylonitrile can be polymerised or copolymerised with other vinyl monomers in solution with a new initiator comprising a peroxy compound, a reducing agent, and a boron compound.

---

The present invention relates to the solution polymerisation of acrylonitrile.

In order to prepare solutions of polyacrylonitrile which are directly spinnable, it has been proposed to polymerise acrylonitrile in solvents for polyacrylonitrile such as dimethylformamide, dimethylsulphoxide or ethylene glycol carbonate. In this type of polymerisation the most commonly used initiators are azo-bis-isobutyronitrile, ammonium or potassium persulphate, and ultraviolet radiation. It has also been proposed (see French patent specification No. 1,203,479) to polymerise acrylonitrile in solution in dimethylformamide at 30 to 80° C., using, as initiator, acyl peroxides such as lauroyl or butyryl peroxide. However, hydroperoxides, hydroxy-hydroperoxides and per-esters do not for practical purposes initiate the solution polymerisation of acrylonitrile under the same conditions.

A new initiator system comprising a peroxy-compound has now been found which makes it possible to initiate the polymerisation of acrylonitrile with peroxides which, by themselves, are inactive, or to boost the initiating power of peroxides which, by themselves, are only relatively weak initiators.

The new initiators comprise: (a) a peroxy compound, which may be an inorganic compound such as hydrogen peroxide or an organic compound such as a hydroperoxide, hydroxy-hydroperoxide, per-acid or ester of a per-acid; (b) an organic reducing agent; and (c) a boron compound such as boric oxide, a boric acid, e.g. orthoboric or metaboric acid, or a borate ester. The invention includes within its scope a process for the polymerisation of acrylonitrile, alone or in admixture with another vinyl monomer which comprises contacting acrylonitrile, and other vinyl monomer (if any), in solution with the new polymerisation initiator.

The hydroperoxides, hydroxy-hydroperoxides, per-acids and per-esters which may be used as the peroxy compound may be selected from amongst those mentioned in Houben-Weyl, Methoden der organischen Chemie, Makromolekulare Stoffe 14/1, pp. 231 to 243. Examples of suitable compounds are t-butyl hydroperoxide, cyclohexyl hydroperoxide, cumyl hydroperoxide, pinane hydroperoxide; methyl ethyl ketone hydroperoxide, cyclohexanone hydroperoxide, methyl hydroxy-hydroperoxide, diethyl ketone hydroperoxide, and performic, peracetic and perbenzoic acids. These per-acids may be used preformed or may be prepared "in situ" from hydrogen peroxide and the corresponding acid. Suitable per-esters include methyl ethyl or t-butyl peracetate or t-butyl perbenzoate.

The organic reducing agent (b) may be any of those normally used in redox polymerisation systems. Suitable compounds are sugars such as glucose, benzoin, dihydroxy-acetone, ascorbic acid, tartaric acid, lactic acid, citric acid, and stannous oxalate.

The boron compound may be boric oxide or a boric acid. The alkyl, cycloalkyl, alkylcycloalkyl, aryl, alkylaryl and aralkyl orthoborates and metaborates may also be used, especially methyl, ethyl, propyl, amyl, cyclohexyl, phenyl and benzyl orthoborates.

In the new initiators the peroxide is normally used in a proportion of 0.01 to 5% of the weight of the monomer, preferably 0.1 to 2%. The reducing agent is used in an amount substantially equimolecular to the peroxide, and the boron compound is used in an amount such that there is at least 0.01 mol, and preferably 0.1 to 1 mol, of boric acid or boric acid equivalent per peroxide group. A ratio greater than 1 only very slightly changes the degree of conversion of the monomer within a given time.

The organic solvents normally used as solvents for the polymerisation of acrylonitrile may be used as the polymerisation medium in the presence of the new initiators. Dimethylformamide, dimethylsulphoxide, ethylene glycol carbonate and propylene glycol carbonate may be more especially mentioned.

The polymerisation temperature may vary within quite wide limits depending on the various components of the initiator system. It may for example be from 20° to 100° C. Similarly the pressure may be at, below or above atmospheric pressure, though there is rarely any advantage in operating other than at atmospheric pressure. The atmosphere above the reaction medium should be inert, e.g. nitrogen.

The new initiators are not only suitable for the solution polymerisation of acrylonitrile, but also for its copolymerisation with monomers having at least one polymerisable vinyl group $CH_2=C<$. Suitable such monomers include acrylic and methacrylic esters (e.g. methyl acrylate and methacrylate); acrylic and methacrylic amides; acrylic and methacrylic acids; unsaturated sulphonic acids (e.g. p-vinylbenzenesulphonic and p-vinyloxybenzenesulphonic acids); vinyl esters (e.g. vinyl acetate or benzoate); allyl esters (e.g. allyl acetate); and vinyl-aromatic compounds (e.g. styrene and p-methylstyrene). Normally the proportion of such copolymerisable monomer or monomers will not be more than 1 mol per mol of acrylonitrile.

The following examples illustrate the invention.

EXAMPLE 1

The apparatus used consists of a cylindrical 500 cm.$^3$ glass reactor fitted with a stainless steel blade stirrer revolving at 220 r.p.m., a reflux condenser fitted at the top with a bubble-counter, a thermometer sleeve and a dropping funnel having a nitrogen inlet below the tap.

Before introducing the reagents the apparatus is purged by sweeping it with a stream of nitrogen for 30 minutes. 100 g. of acrylonitrile and 195 g. of dimethylformamide are then introduced while the stream of nitrogen at the top of the condenser is maintained. The apparatus is then immersed in a tank containing water maintained at 60° C. by a thermostat. When the temperature of the contents of the reactor reaches 60° C., 0.86 g. of cyclohexyl hydroperoxide (i.e. $7.4 \times 10^{-3}$ mol), 1.31 g. of ascorbic acid ($7.4 \times 10^{-3}$ mol) and 0.47 g. of orthoboric acid ($7.4 \times 10^{-3}$ mol) dissolved in 5 g. of dimethylformamide are introduced with stirring. The mixture is allowed to react for 5 hours under these conditions, and a thick polymer solution is obtained. To determine the yield an aliquot portion representing ⅕ of the reaction mixture is introduced into 300 cm.$^3$ of distilled water with stirring. The polymer precipitates as fine particles which are filtered off, washed on the filter with 800 cm.$^3$ of boiling distilled water, sucked dry, and dried in an oven at 60° C. under a pressure of 50 mm. Hg.

From this aliquot portion 14.8 g. of a polymer of specific viscosity 0.115 (measured at 25° C. on a solution in dimethylformanmide containing 2 g. of polymer per litre) are obtained.

Working under the same conditions but at 50° C., the degree of conversion is 39% and the specific viscosity 0.140.

If the same experiment is carried out omitting either the boric acid or the ascorbic acid, or both, no polymerisation of acrylonitrile occurs.

EXAMPLE 2

A series of experiments is carried out as in Example 1 but at 70° C. using, in solution in 5 g. of dimethylformamide, the initiators given in the Table below, which also gives the results obtained.

| t-Butyl hydroperoxide | Ascorbic acid | Boric acid | Degree of conversion, percent |
|---|---|---|---|
| 1 g. ($11.1 \times 10^{-3}$ mol) | 1.96 g. ($11.1 \times 10^{-3}$ mol). | 0.7 g. ($11.1 \times 10^{-3}$ mol.) | 68 |
| 1 g. ($11.1 \times 10^{-3}$ mol) | Nil | Nil | 6 |
| 1 g. ($11.1 \times 10^{-3}$ mol) | 1.96 g. | Nil | 4.5 |
| 1 g. ($11.1 \times 10^{-3}$ mol) | Nil | 0.7 g. | 4 |

EXAMPLE 3

A series of experiments is carried out as in Example 1, but at 70° C. The initiators, used in solution in 5 g. of dimethylformamide are as given in the table below, which also gives the results obtained:

| Cumene hydroperoxide | Ascorbic acid | Boric acid | Degree of conversion, percent |
|---|---|---|---|
| 0.7 g. ($5.6 \times 10^{-3}$ mol) | 0.81 g. ($4.6 \times 10^{-3}$ mol). | 0.285 g. ($4.6 \times 10^{-3}$ mol). | 55 |
| 0.7 g. ($4.6 \times 10^{-3}$ mol) | 0.81 g. ($4.6 \times 10^{-3}$ mol). | Nil | 0 |
| 0.7 g. ($4.6 \times 10^{-3}$ mol) | Nil | 0.285 g. | 14 |
| 0.7 g. ($4.6 \times 10^{-3}$ mol) | Nil | Nil | 0 |

EXAMPLE 4

A series of experiments is carried out at 50° C. in the same apparatus as in Example 1, with the initiators in solution in 5 g. of dimethylformamide, being in each case as described in the table below, which also gives the results obtained.

| Pinane hydroperoxide | Ascorbic acid | Boric acid | Degree of conversion, percent |
|---|---|---|---|
| 1 g. ($5.9 \times 10^{-3}$ mol) | 1.035 g. ($5.9 \times 10^{-3}$ mol). | 0.365 g. ($5.9 \times 10^{-3}$ mol). | 60 |
| 1 g. ($5.9 \times 10^{-3}$ mol) | 1.035 g. ($5.9 \times 10^{-3}$ mol). | Nil | 0 |
| 1 g. ($5.9 \times 10^{-3}$ mol) | Nil | 0.365 g. | 0 |
| 1 g. ($5.9 \times 10^{-3}$ mol) | Nil | Nil | 0 |

EXAMPLE 5

A series of experiments is carried out at 60° C. in the same apparatus as in Example 1, with the initiators in solution in 5 g. of dimethylformamide being in each case as given in the table below, which also gives the results obtained:

| Hydrogen peroxide * | Ascorbic acid | Boric acid | Degree of conversion, percent |
|---|---|---|---|
| 0.4 g. ($11.7 \times 10^{-3}$ mol) | 2.07 g. ($11.70 \times 10^{3}$ mol). | 0.73 g. ($11.7 \times 10^{-3}$ mol). | 58 |
| 0.4 g. ($11.7 \times 10^{-3}$ mol) | 2.07 g. ($11.7 \times 10^{3}$ mol). | Nil | 3 |
| 0.4 g. ($11.7 \times 10^{-3}$ mol) | Nil | 0.73 g. | 0 |
| 0.4 g. ($11.7 \times 10^{-3}$ mol) | Nil | Nil | 0 |

* In the form of a 120 volume aqueous solution, i.e. containing 11.6 mols of $H_2O_2$ per litre.

11.6 mols of $H_2O_2$ per litre.

EXAMPLE 6

Polyacrylonitrile is obtained in a yield of 13% by working as in Example 1 at a temperature of 40° C. and using an initiator consisting of hydrogen peroxide (0.4 g., $11.7 \times 10^{-3}$ mol), glacial acetic acid ($11.7 \times 10^{-3}$ mol), ascorbic acid (2.07 g. $11.7 \times 10^{-3}$ mol), and boric acid (0.73 g., $11.7 \times 10^{-3}$ mol).

In the absence of boric acid, or in the presence of the hydrogen peroxide/acetic acid couple only, no polymer forms.

EXAMPLE 7

Working as in Example 1, at the temperatures and with the initiators indicated in the table below, the results given in the same table are obtained, which show the effect of boric acid on systems consisting of ascorbic acid and various peroxides.

| Peroxides | Temperature, °C. | Ascorbic acid | Boric acid | Degree of conversion, percent |
|---|---|---|---|---|
| Methyl ethyl ketone hydroperoxide* (1 g.). | 50 | 1 g. ($5.69 \times 10^{-3}$ mol) | 0.5 g. ($8.09 \times 10^{-3}$ mol) | 64 |
| Do | 50 | 1 g. ($5.69 \times 10^{-3}$ mol) | Nil | 3 |
| t-Butyl peracetate (1 g. $7.6 \times 10^{-3}$ mol). | 60 | 1.33 g. ($7.6 \times 10^{-3}$ mol) | 0.47 g. ($7.6 \times 10^{-3}$ mol) | 77 |
| Do | 60 | 1.33 g. ($7.6 \times 10^{-3}$ mol) | Nil | 0 |
| t-Butyl perbenzoate (1 g. $5.15 \times 10^{-3}$ mol). | 60 | 0.91 g. ($5.15 \times 10^{-3}$ mol) | 0-32 g. ($5.15 \times 10^{-3}$ mol) | 53 |
| Do | 60 | 0.91 g. ($5.15 \times 10^{-3}$ mol) | Nil | 0 |

*Used as a 50% solution in dimethyl phthalate. The hydroperoxide consists of a mixture of hydroxy-2-hydroperoxy-butane and of 2,2-bis(hydroperoxy)-butane in an undetermined ratio.

EXAMPLE 8

A series of experiments is carried out as in Example 1 using dimethylsulphoxide (195 g.) in place of dimethylformamide with the initiators indicated in the following table, which also shows the results obtained.

| Peroxides | Temperature, °C. | Ascorbic acid | Boric acid | Degree of conversion, percent |
|---|---|---|---|---|
| Cyclohexyl hydroperoxide (0.86 g., $7.4 \times 10^{-3}$ mol). | 60 | 1.31 g. ($7.4 \times 10^{-3}$ mol) | 0.47 g. ($7.4 \times 10^{-3}$ mol) | 70 |
| Do | 60 | 1.31 g. ($7.4 \times 10^{-3}$ mol) | Nil | 0 |
| Cumyl hydroperoxide (0.7 g., $4.6 \times 10^{-3}$ mol). | 70 | 0.81 g. ($4.6 \times 10^{-3}$ mol) | 0.285 g. ($4.6 \times 10^{-3}$ mol) | 75 |
| Do | 70 | 0.81 g. ($4.6 \times 10^{-3}$ mol) | Nil | 0 |
| t-Butyl hydroperoxide (1 g., $11.1 \times 10^{-3}$ mol). | 70 | 1.96 g. ($11.1 \times 10^{-3}$ mol) | 0.7 g. ($11.1 \times 10^{-3}$ mol) | 74 |
| Do | 70 | 1.96 g. ($11.1 \times 10^{-3}$ mol) | Nil | 0 |
| t-Butyl perbenzoate (1 g., $5.15 \times 10^{-3}$ mol). | 60 | 0.91 g. ($5.15 \times 10^{-3}$ mol) | 0.32 g. ($5.15 \times 10^{-3}$ mol) | 67 |
| Do | 60 | 0.91 g. ($5.15 \times 10^{-3}$ mol) | Nil | 0 |
| Pinane hydroperoxide (1 g., $5.9 \times 10^{-3}$ mol). | 50 | 1.036 g. ($5.9 \times 10^{-3}$ mol) | 0.365 g. ($5.9 \times 10^{-3}$ mol) | 95 |
| Do | 50 | 1.036 g. ($5.9 \times 10^{-3}$ mol) | Nil | 0 |

EXAMPLE 9

A series of polymerisation experiments is carried out as in Example 1 with the initiators being as given in the table below, which also gives the results obtained.

| Boron compound | Temperature, °C. | Solvent | Peroxide | Ascorbic acid, g. | Degree of conversion, percent |
|---|---|---|---|---|---|
| Methyl borate (0.53 g., 5.15×10⁻³ mol) | 60 | Dimethyl sulphoxide | t-Butyl perbenzoate [1] | [2] 0.91 | 82 |
| Amyl borate (1.4 g., 5.15×10⁻³ mol) | 60 | do | do.[1] | [2] 0.91 | 90 |
| $B_2O_3$ (2.57×10⁻³ mol) | 60 | Dimethylformamide | do.[1] | [2] 0.91 | 70 |
| Methyl borate (0.8 g., 7.4×10⁻³ mol) | 50 | do | Cyclohexyl hydroperoxide [3] | [4] 1.31 | 65 |

[1] 1 g., 5.15×10⁻³ mol.
[2] 5.65×10⁻³ mol.
[3] 0.86 g., 7.4×10⁻³ mol.
[4] 7.4×10⁻³ mol.

EXAMPLE 10

Example 1 is repeated using, as initiators, butyl perbenzoate (1 g., 5.15×10⁻³ mol), benzoin (5.15×10⁻³ mol), and orthoboric acid (5.15×10⁻³ mol). The degree of conversion obtained is 26%. With no benzoin, no polymerisation takes place.

EXAMPLE 11

The experiment of Example 1 is repeated with, as initiator, t-butyl perbenzoate (1 g., 5.15×10⁻³ mol), ascorbic acid (0.91 g., 5.15×10⁻³ mol), and the various amounts of boric acid given in the following table so as to vary the molar ratio of boric acid/redox system. The results obtained are given in the table below.

| Boric acid in grams: | Molar ratio, $H_3BO_3$/redox | Degree of conversion, percent |
|---|---|---|
| 0.08 | 0.25 | 35 |
| 0.16 | 0.5 | 51 |
| 0.32 | 1 | 63 |
| 0.64 | 2 | 66 |
| 1.28 | 4 | 60 |

EXAMPLE 12

A series of experiments is carried out as described in Example 1, the monomers and their amounts, the initiators and the temperature in each experiment being as given in the table below, which also indicates the results obtained:

I claim:

1. Process for the polymerization of a monomer system comprising acrylonitrile, alone or in admixture with another vinyl monomer in a proportion not exceeding 1 mol per mol of acrylonitrile, which comprises contacting the said monomer system at 20° to 100° C., in solution in dimethylformamide, dimethylsulphoxide, ethylene glycol carbonate, or propylene glycol carbonate with a polymerization initiator comprising (a) 0.01 to 5% by weight of the monomer or monomers of a peroxy compound selected from the group consisting of hydrogen peroxide, a hydroperoxide, a hydroxy-hydroperoxide and a per-acid and an ester thereof, (b) an organic reducing agent selected from the group consisting of glucose, benzoin, dihydroxyacetone, ascorbic acid, tartaric acid, lactic acid, citric acid and stannous oxalate in an amount substantially equimolecular to the peroxy compound, and (c) a boron compound selected from the group consisting of boric oxide, a boric acid, and a lower alkyl borate in a proportion of 0.01 to 1 mol per mol of peroxy group equivalent.

2. Process according to claim 1, in which the organic reducing agent is ascorbic acid.

3. Process according to claim 1, in which the organic reducing agent is benzoin.

4. Process according to claim 1 in which the peroxy compound is cyclohexyl hydroperoxide.

5. Process according to claim 1 in which the peroxy compound is t-butyl hydroperoxide.

6. Process according to claim 1 in which the peroxy compound is cumene hydroperoxide.

7. Process according to claim 1 in which the peroxy compound is pinane hydroperoxide.

8. Process according to claim 1 in which the peroxy compound is peracetic acid.

9. Process according to claim 1 in which the peroxy compound is methyl ethyl ketone hydroperoxide.

| Monomers | Temperature, °C. | Solvent, g. | Peroxides | Ascorbic acid, g. | Boron derivative | Degree of conversion, percent |
|---|---|---|---|---|---|---|
| Acrylonitrile, 95 g.; methyl methacrylate, 4 g.; potassium p-vinyloxybenzene sulphonate, 1 g. | 50 | Dimethylformamide, 200. | Cumene hydroperoxide.[1] | [2] 0.99 | Methyl borate [3] | 77 |
| Do | 60 | Dimethylsulphoxide, 200. | t-Butyl perbenzoate [4] | [5] 0.91 | Boric acid [6] | 93 |
| Acrylonitrile 80 g.; vinylidene chloride, 20 g. | 50 | Dimethylformamide, 200. | Methyl ethyl ketone hydroperoxide, 1 g.[7] | [8] 1 | Methyl borate [9] | 62 |
|  |  | 200 | do | [8] 1 |  | 0 |
| Acrylonitrile, 80 g.; vinyl acetate, 20 g. | 50 | do | Methyl ethyl ketone hydroperoxide, 1 g.[7] | [8] 1 | Methyl borate, 0.84 g. | 63 |
|  |  |  | do | [8] 1 | Nil | 15 |
| Acrylonitrile, 80 g.; styrene, 20 g. | 50 | do | Methyl ethyl ketone hydroperoxide, 1 g.[7] | [8] 1 | Methyl borate, 0.84 g. | 62 |
|  |  |  | do | [8] 1 | Nil | 31 |
| Acrylonitrile, 50 g.; styrene, 50 g. | 50 | do | Methyl ethyl ketone hydroperoxide, 1 g.[7] | [8] 1 | Methyl borate, 0.84 g. | 44 |
|  |  |  | do | [8] 1 | Nil | 22 |

[1] 0.86 g., 5.65×10⁻³ mol.
[2] 5.65×10⁻³ mol.
[3] 0.8 g., 7.7×10⁻³ mol.
[4] 1 g., 5.15×10⁻³ mol.
[5] 5.15×10⁻³ mol.
[6] 0.32 g., 5.15×10⁻³ mol.
[7] As a 50% solution in dimethyl phthalate.
[8] 5.69×10⁻³ mol.
[9] 0.84 g., 8.1×10⁻³ mol.

10. Process according to claim 1 in which the peroxy compound is t-butyl peracetate.

11. Process according to claim 1 in which the peroxy compound is 5-butyl perbenzoate.

12. Process according to claim 1 in which the peroxy compound is hydrogen peroxide.

References Cited

UNITED STATES PATENTS

| | | |
|---|---|---|
| 3,025,284 | 3/1962 | George et al. |
| 3,060,157 | 10/1962 | Goodman et al. |
| 3,222,429 | 12/1965 | Boyd et al. |
| 3,251,810 | 5/1966 | Buning. |
| 3,275,611 | 9/1966 | Mottus et al. |

OTHER REFERENCES

Okuda et al., Chem. Abs., 54 (1964), p. 7235i.

HARRY WONG, Jr., Primary Examiner

U.S. Cl. X.R.

252—426; 260—29.1, 30.8, 32.6, 47, 79.3, 88.7